United States Patent [19]

Nordstrom

[11] 4,046,052

[45] Sept. 6, 1977

[54] TORQUE LIMITING RF CONNECTOR

[75] Inventor: Donald B. Nordstrom, Stuart, Fla.

[73] Assignee: Solitron Devices, Inc., Tappan, N.J.

[21] Appl. No.: 732,203

[22] Filed: Oct. 14, 1976

[51] Int. Cl.² ............................................. F16B 31/02
[52] U.S. Cl. ............................................. 85/61; 85/32.1;
174/35 C; 339/143 R
[58] Field of Search ................. 85/61, 62, 32.1;
151/19 A, 11, 10, 69; 174/35 C; 339/143 R, 143
C, 143 T

[56] References Cited

U.S. PATENT DOCUMENTS

| 1,289,867 | 12/1918 | Moore | 151/11 X |
| 2,108,032 | 2/1938 | Allen | 151/48 X |
| 2,412,409 | 12/1946 | Martin | 151/19 A |
| 3,124,406 | 3/1964 | Cook | 339/143 R X |
| 3,504,591 | 4/1970 | Christophersen | 85/61 |

FOREIGN PATENT DOCUMENTS

| 324,581 | 1/1930 | United Kingdom | 85/61 |

*Primary Examiner*—Ramon S. Britts
*Attorney, Agent, or Firm*—Richard G. Geib

[57] ABSTRACT

A torque limiting RF connector having a base ring for supporting RF connector means about which is operatively related to a torque ring joining a hex ring thereto such that torque is transmitted from the hex ring through the torque ring to the base ring in affixing an RF connection by threading the base ring to a part with which it will mate the connector means such that there is a limit of the applied torque which will not be exceeded.

11 Claims, 12 Drawing Figures

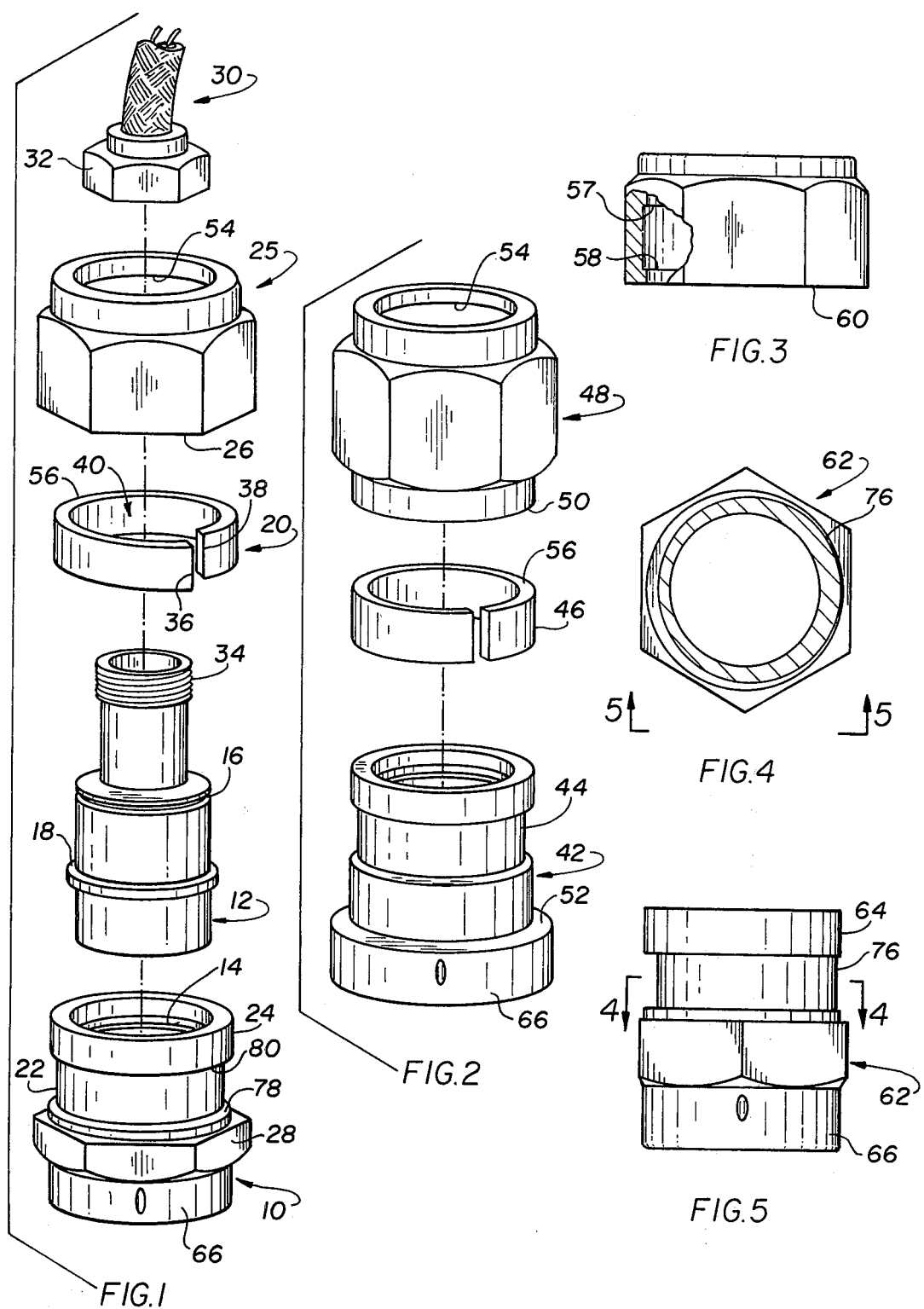

TORQUE LIMITING RF CONNECTOR

BACKGROUND

1. Field of Invention

The invention relates to connectors for use as RF connectors whereby insulated contacts can be joined without excessive forces that could degrade electrical performance by means that will in the connector provide for uniform tightening of the connection.

2. Description of the Prior Art

It is known to have connections which incorporate means to limit the torque of application. Among such prior art techniques is that shown by U.S. Pat. No. 3,504,591. This teaching decrees that one must use a body that is grooved in two places to support two springs independently inserted in the groove and held for subsequent assembly as by a separate retaining ring of a shell which is used to tighten the body to another part of a coupling.

SUMMARY OF THE INVENTION

The present invention overcomes some of the disadvantages of previously know torque limiting couplers and brings them to the RF connector art for the first time in doing so. Essentially, the problem noted for prior art designs which had to be eliminated was one of providing a reliable coupler that could be easily tightened to a predetermined torque and backedoff within the size limitations of pre-existing RF connectors.

Another object of this invention is to obtain a torque limiting connector which would entail a minimum of elements in using the torque limiting means as an assembly means.

The ultimate object achieved by this invention is to provide, for example, a coupling nut in a RF connection that can be tightened to a predesigned torque value without the need for special torque wrenches, greatly simplifying assembly or disassembly when assembling, servicing or testing microwave equipment.

A still further object of this invention is to provision a coupler with means that may be limitive of torque so that higher and lower torque values may be achieved with substitution of said means.

DRAWING DESCRIPTION

FIG. 1 is an exploded isometric view of the elements of a preferred embodiment of this invention;

FIG. 2 is a similar exploded isometric of an alternative coupling nut assembly in accordance with this invention;

FIG. 3 is a partially cross sectional side view of the hex ring portion of the coupling nut assembly of both FIGS. 1 and 2;

FIG. 4 is a cross-sectioned plan view of an alternative base ring in accordance with this invention;

FIG. 5 is a full side view of the base ring of FIG. 4;

Figure 6A:
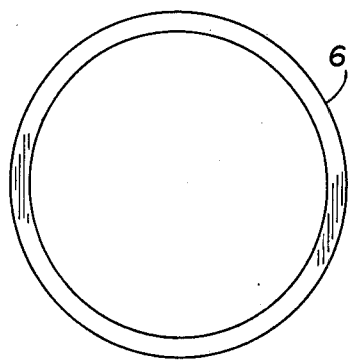
Figure 6B:
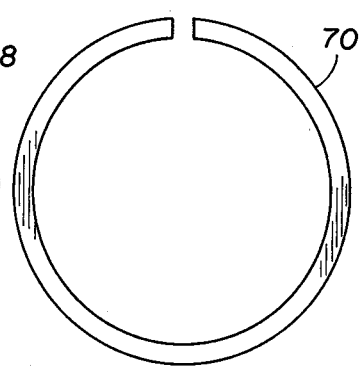
Figure 7:
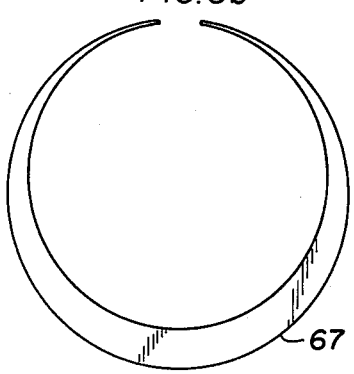
Figure 9:
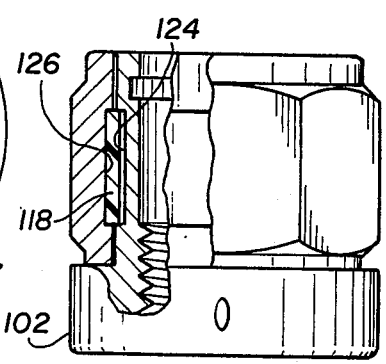
Figure 8:
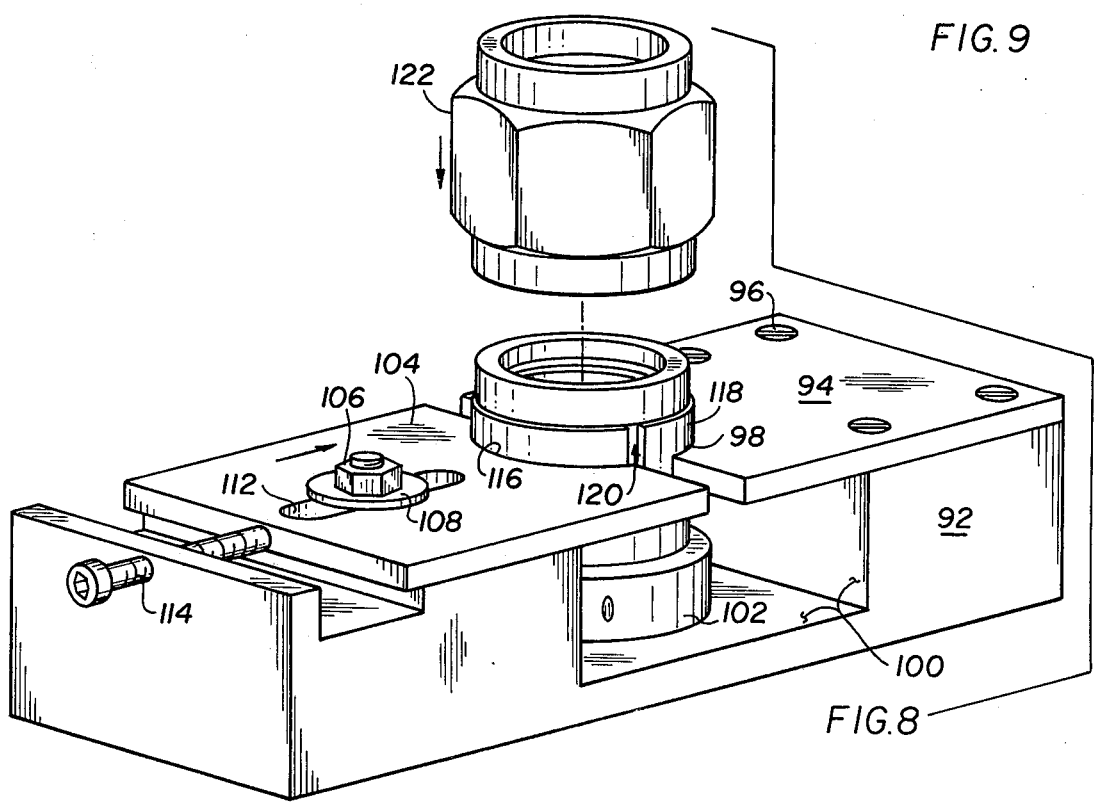

FIGS. 6a, b, c and d are plan views of tension rings in accordance with this invention;

FIG. 7 is a plan view of a camming tension ring in accordance with this invention as required by the base ring structure of FIGS. 4 and 5;

FIG. 8 is an isometric view of a tool in accordance with this invention for assembly of the coupling nut assembly; and FIG. 9 is a partially cross-sectioned side view of the coupling nut assembly after removal from the tool of FIG. 8 and final pressing of hex ring onto base ring.

DETAILED DESCRIPTION

With more particular reference to FIG. 1 there it is shown by means of an exploded view the elements of this invention in a preferred form. Specifically, a base ring 10 is bored to receive a cable body 12. A groove 14 in base ring 10 with groove 16 in cable body 12 receives the normal C shaped retaining ring (not shown) to hold cable body 16 in base ring 10 on flange 18 of the cable body 12.

A tension ring 20 is fitted in recess 22 of base ring 10 such that it will in a free state be of slight larger diameter than the end 24 of base ring 10. Upon compression of tension ring 20, as will be later discussed, the hex ring 25 is placed over tension ring 20 on base ring 10 until hex end 26 is abutting hex portion 28 of base ring 10. Thereafter, coaxial cable 30 is coupled to cable body by threading nut 32 on threaded end 34.

In passing it should be noted that ring 20 is shown having in a free state a sprung separation of ends 36 and 38 at the slot area 40. Also body 12 is of the female type having dielectric insulated receptacle for an inner pin connection.

The main elements of this invention may take another form, as shown by FIG. 2. There the main differences are a base ring 42 which is not provided with a hex portion, and a tension ring which is not provided with planar displaced ends. More particularly, base ring 42 is provided with a grooved surface 44 for tension ring 46. In such construction hex ring 48 has greater body height with an annular end 50 bearing on shoulder 52 when assembled over tension ring 46 on base ring 42 until a slight shoulder 54 within hex ring 48, as in 25, abuts upper surface 57 of respective rings 46 and 20, until a similar shoulder 58 (See FIG. 3) has passed by the ring 46 or 20. Actually, FIG. 3 shows a partially cross-sectioned side view of a nut (hex ring) 60 similar to hex ring 25. It is used with an alternate base ring 62 shown by FIGS. 4 and 5. The base ring has an eccentric groove. A preferred manner of machining this groove is to cut same so that one has a groove at one side of 0.002 in ±0.001 in to 0.02 in ±0.002 in diametrically opposite such shallow cut with smooth surface graduation therebetween. This cut is possible in a 0.480 diameter body portion 64 and turning the groove cut on a center 0.020 ± 0.002 in off the center of the base ring.

As for the structures of FIGS. 1 and 2 assuming a concentric groove diameter of 0.480 one may better appreciate this invention by noting that body end is dimensioned to 0.525 ± 0.001 inches and the inside diameter of nuts 25 and 48 is 0.530 ± 0.001 inches with a surface between shoulder 57 and 58 of 0.537 ± 0.001 inches. With parts such as the above typical base ring and hex ring the tension ring has an outside diameter of 0.535 ± 0.000 − 0.002 inches and an inside diameter of 0.483 ± 0.001 inches and a height of 0.30 ± 0.001 inches with a slot between ends of 0.030/0.040 inches.

Completing the construction is the drilling of end 66 to provide for wire lock means as required by specifications in some uses of the coupling nut of this invention.

FIGS. 6a, b, c and d show various forms of tension rings which have been found to have utility with the coupling nuts of FIGS. 1 and 2. FIG. 7 shows the type of tension ring 67 to be used with the base ring structure of FIGS. 4 and 5. With the use of a solid ring 68 the assembly would be to freeze base ring and heat tension ring 68. Slotted rings 70, 72 and 74, ring 70 being of a type shown in FIGS. 1 and 2, will expand for assembly on base rings and shrink for assembly of hex rings. With the solid ring on a base ring it would be shrunk by cooling to assemble a hex ring.

As for the materials the standard is brass for the base ring and hex ring. As for the tension ring it has been found that various materials can be used to give predictable torque values for the coupling nut assembly. For example, with Bakelite the nut is good for assemblies that require 32–60 in/lbs., with stainless steel the nut is good for assemblies requiring 15–30 in/lbs., and with a Nylon tension ring the nut is good for assemblies limited to torque from 0 to 20 in/lbs. in assembly. In essence then in this invention the preset shape of the tension ring, its cross sectional dimensions and its material of construction providing variable physical characteristics determines the non-destructive friction developed against the base ring and hex ring which determines the preset torque in mating with another RF connector that will maintain a desired dielectric constant within the connection.

With the base ring of FIGS. 4 and 5 and tension ring 67 of FIG. 7 this torque is further defined by a camming action of tension ring 67 on eccentric surface 76 forced, of course, by wrenching hex ring 60 in assembling the coupling nut to another fitting member. When the desired torque of such wrenching is reached hex ring will be allowed to rotate without rotating base ring 62 by carrying a cable body further. This operation would be equally true of coupling nuts of FIGS. 1 and 2.

Figure 6C:
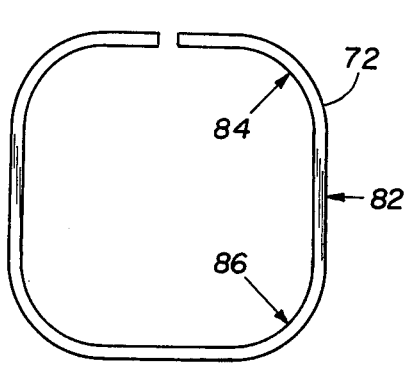
Figure 6D:
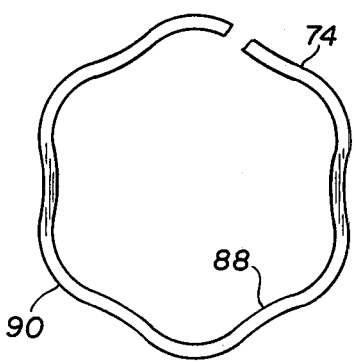

With reference to the planar off-set form of tension ring in addition to having frictional connection of its inner surface with base ring and outer surface with hex ring the ends 36 and 38 have a normal bias to bite shoulders 78 and 80 of the base ring and with reference to FIG. 3 shoulders 58 and 57. Finally, the tension rings of FIGS. 6c and 6d also react differently enough to warrant further description. A force such as shown by arrow 82 in FIG. 6c intermediate the ends, being the frictional connection of hex ring to base ring, will create reactive forces 84 and 86 to expand the corners and when sufficient shrink the ring 72 to allow slippage of the hex ring about the base ring. Ring 74 of FIG. 6d is formed to have depressions 88 for contact with the base ring and crowns 90 for contact with the hex ring. When ring 74 is loaded to its maximum it will expand to permit slippage of the hex ring with regard to the base ring.

With reference to FIG. 8 there is shown a tool 92 for assembly of the coupling nut elements. On the body of this tool is a plate 94, shown fixed by four machine bolts 96 but which may be mounted to slide in and out, having a contoured edge 98.

Tool 92 has a recessed portion 100 to receive and support base ring 102 to stand vertically from the tool 92. On the other side of recess 100 a plate 104 is slidably mounted as by nut 106 and washer 108 on stud 110 through a slot 112 of plate 104. A long set screw 114 is threaded through tool 92 to bear on plate 104. Screwing clockwise one may slide plate 104 so that its contoured surface 116 will with surface 98 bear on and compress slotted tension ring 118. If desired a ball and socket connection could be provided between screw 114 and plate 104 to pull plate 104 as well as push it.

When tension ring has been compressed to close the slot area 120, hex ring 122 is inserted over the ring to rest on plates 94 and 104 which are of a height to have ring 118 thereabove. After this, the partial assembly of hex ring, tension ring and base ring is removed from recess 100 of tool 92 and placed on plate 94 with further downward pressure on hex ring forcing it by the tension ring until shoulders abut a larger ID portion in hex ring bore straddle the tension ring.

FIG. 9 shows such completed assembly where tension ring 118 fills grooves 124 of base ring 102 and 126 of hex ring 122.

Having described several structures, not as a limitation on the objects of this invention but as presently known forms it may take, their utility of operation and a manner of assembly that will permit same, it is now desired to set forth the claims for these Letters Patent, as follows:

I claim:

1. An RF coupling nut comprising:
   an RF cable body;
   a base ring to support said cable body, said base ring having internal connecting means at one end for the coupling of said cable body therewithin, a shoulder and an elongated body above said shoulder, said elongated body having a grooved surface;
   a tension ring rotatably supported within said grooved surface on said base ring, said tension ring having a cross sectional thickness such that it presents an external diameter greater than said elongated body but less than said shoulder; and
   a hex ring having an internal groove of a diameter less than the external diameter of the tension ring compressing said tension ring between and into frictional engagement with said base ring and said hex ring, said hex ring having one end resting against said shoulder when connected to said base ring by said tension ring, said frictional engagement providing frictional connection between the hex ring and base ring that is torque limiting in that said hex ring bi-directionally drives said base ring via said tension ring which is free to rotate when a torque is reached exceeding frictional contact of said tension ring with either or both said base ring or hex ring.

2. The coupling nut of claim 1 wherein said tension ring is a slotted ring.

3. The coupling nut of claim 1 wherein the tension ring is formed to in addition to a lateral forced connection has a normal bias.

4. The coupling nut of claim 1 where the tension ring is an eccentric ring such that driving forces from the hex ring to base ring will force a wedging action of the tension ring between the hex ring and base ring.

5. The coupling nut of claim 1 where the tension ring is formd to have other than an annular profile to control contact areas to less than the total inner and outer surfaces of the tension ring.

6. The coupling nut of claim 1 wherein the base ring has a hex portion adjacent the hex ring.

7. An RF coupling nut comprising:
   a base ring having a hexagonal shoulder under a body portion within which is a cable body connector, said base ring having a groove between the hexagonal shoulder and its other end spaced therefrom;
   a tension ring rotatably supported and located by the groove of said base ring, said tension ring being of a cross section that in its free state has a greater external diameter than said base ring between the hexagonal shoulder and the other end; and
   a hex ring mounted on the body of said base ring, said hex ring having a recessed area in its bore receiving the tension ring, said recessed area being within the bore and being of a lesser diameter than the external diameter of the tension ring rotatably supporting and locating said hex ring on said base ring with said tension ring compressed therebetween in frictional engagement with said base ring and said hex ring, said frictional engagement defining a torque limiting driving connection between the hex ring and the base ring for coupling of the cable body.

8. The coupling nut of claim 7 wherein said tension ring is a slotted ring.

9. The coupling nut of claim 7 wherein the tension ring is formed to in addition to a lateral forced connection has a normal bias.

10. The coupling nut of claim 7 where the tension ring is an eccentric ring such that driving forces from the hex ring to base ring will force a wedging action of the tension ring between the hex ring and base ring.

11. The coupling nut of claim 7 where the tension ring is formed to have other than an annular profile to control contact areas to less than the total inner and outer surfaces of the tension ring.

* * * * *